United States Patent
Jung et al.

(10) Patent No.: US 7,962,097 B2
(45) Date of Patent: Jun. 14, 2011

(54) METHOD AND SYSTEM FOR IDENTIFYING DEVICE ON UNIVERSAL PLUG AND PLAY NETWORK AND PLAYING CONTENT USING THE DEVICE

(75) Inventors: Dong-shin Jung, Seoul (KR); Joo-yeol Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1208 days.

(21) Appl. No.: 11/264,024

(22) Filed: Nov. 2, 2005

(65) Prior Publication Data
US 2006/0094360 A1    May 4, 2006

(30) Foreign Application Priority Data
Nov. 2, 2004 (KR) .................. 10-2004-0088405

(51) Int. Cl.
- *H04B 7/00* (2006.01)
- *H04B 5/00* (2006.01)
- *H04B 1/38* (2006.01)
- *H04W 72/00* (2009.01)
- *G05B 11/01* (2006.01)
- *G05B 19/18* (2006.01)
- *G06F 7/00* (2006.01)
- *G06F 15/16* (2006.01)
- *G06F 15/173* (2006.01)
- *G06F 3/00* (2006.01)
- *G06F 13/00* (2006.01)

(52) U.S. Cl. ...... 455/41.2; 455/41.1; 455/450; 455/557; 700/17; 700/65; 700/224; 709/217; 709/223; 709/231; 710/11; 710/33; 715/716; 715/738

(58) Field of Classification Search ........ 455/3.01–3.06, 455/41.1–41.3, 403, 412.1, 414.1, 417, 455, 455/457, 557, 412.2, 418, 432.3, 140, 406, 455/414.2, 450, 453, 556.1; 370/229, 230, 254, 328, 338, 389, 395.1–395.3, 465; 700/11, 19, 20, 94, 221, 224, 65, 9, 17, 48, 90, 219, 3, 13; 707/104.1; 709/223, 221, 224, 220, 328, 202, 203, 213, 217–219, 226–232, 250; 381/124; 715/716, 738, 202, 205, 234, 740, 745, 770, 771, 840; 386/46; 710/8, 11, 10, 15, 33, 62; 340/3.1, 447, 539.1, 7.4, 10.6, 156, 159; 705/1.1, 4, 14.26, 14.47, 14.49, 14.61, 14.73, 26, 50, 51, 52, 54.57, 59, 64
See application file for complete search history.

(56) References Cited

U.S. PATENT DOCUMENTS
7,136,709 B2 * 11/2006 Arling et al. .................... 700/65
(Continued)

FOREIGN PATENT DOCUMENTS
EP    1 469 654 A2    10/2004
(Continued)

OTHER PUBLICATIONS

Microsoft Corporation: "Understanding Universal Plug and Play: A Whitepaper", Whitepaper, [Online] Jun. 2000, pp. 1-39, XP007900144.

(Continued)

*Primary Examiner* — Andrew Wendell
*Assistant Examiner* — Paul P Tran
(74) *Attorney, Agent, or Firm* — Sughrue Mion, PLLC

(57) ABSTRACT

A method and system for quickly selecting a device desired by a user from among a plurality of devices on a home network and playing content included in a portable device using the selected device are provided. The method includes displaying a device list of the plurality of content player devices based on the received descriptions, receiving selection of an item on the device list from a user, sending a device notification request message to a content player device corresponding to the selected item, and executing device notification using the content player device that has received the device notification request message.

17 Claims, 10 Drawing Sheets

U.S. PATENT DOCUMENTS

| | | | |
|---|---|---|---|
| 7,155,305 B2 * | 12/2006 | Hayes et al. | 700/224 |
| 7,433,930 B2 * | 10/2008 | Fenizia et al. | 709/217 |
| 7,516,251 B2 * | 4/2009 | Tanaka et al. | 710/33 |
| 7,606,181 B1 * | 10/2009 | Whynot et al. | 370/260 |
| 2003/0101294 A1 * | 5/2003 | Saint-Hilaire et al. | 710/11 |
| 2003/0117433 A1 | 6/2003 | Milton et al. | |
| 2004/0073609 A1 * | 4/2004 | Maekawa et al. | 709/203 |
| 2004/0249907 A1 * | 12/2004 | Brubacher et al. | 709/220 |
| 2005/0027740 A1 * | 2/2005 | Moritani et al. | 707/104.1 |
| 2005/0251576 A1 * | 11/2005 | Weel | 709/227 |
| 2005/0255813 A1 * | 11/2005 | Yoneda et al. | 455/92 |
| 2007/0005788 A1 * | 1/2007 | Kim et al. | 709/231 |
| 2007/0112932 A1 * | 5/2007 | Min et al. | 709/217 |
| 2008/0235198 A1 * | 9/2008 | Duncan et al. | 707/4 |
| 2009/0024717 A1 * | 1/2009 | Im | 709/218 |

FOREIGN PATENT DOCUMENTS

| | | |
|---|---|---|
| EP | 1 484 860 A1 | 12/2004 |
| JP | 9-185577 A | 7/1997 |
| JP | 2002-16619 A | 1/2002 |
| JP | 2002007599 A | 1/2002 |
| JP | 2002-049556 A | 2/2002 |
| JP | 2002291039 A | 10/2002 |
| JP | 2002-328851 A | 11/2002 |
| JP | 2002-334031 A | 11/2002 |
| JP | 2003230184 A | 8/2003 |
| JP | 2003-309736 A | 10/2003 |
| JP | 2004021235 A | 1/2004 |
| JP | 2004-040552 A | 2/2004 |
| KR | 2003-0012918 A | 2/2003 |
| KR | 10-2004-0013465 A | 2/2004 |
| KR | 10-2004-0055450 A | 6/2004 |
| KR | 10-2004-0082521 A | 9/2004 |
| WO | 2004/025901 A2 | 3/2004 |
| WO | WO 2005/043408 * | 10/2004 |

OTHER PUBLICATIONS

Official Inquiry dated Jun. 22, 2010 from the Japanese Patent Office in Japanese Patent Application 2005-300769.

Office Action dated Nov. 2, 2010 issued in counterpart Japanese Patent Application No. 2008-223978.

* cited by examiner

METHOD AND SYSTEM FOR IDENTIFYING DEVICE ON UNIVERSAL PLUG AND PLAY NETWORK AND PLAYING CONTENT USING THE DEVICE

CROSS-REFERENCE TO RELATED APPLICATION

This application claims priority from Korean Patent Application No. 10-2004-0088405 filed on Nov. 2, 2004 in the Korean Intellectual Property Office, the disclosure of which is incorporated herein by reference in its entirety.

BACKGROUND OF THE INVENTION

1. Field of the Invention

The present invention relates to a home network, and more particularly, to a method and system for quickly selecting a device desired by a user from among a plurality of devices on a home network and playing content included in a portable device using the selected device.

2. Description of the Related Art

Performance of portable content management devices such as camera phones and Motion Picture Experts Group Layer-3 (MP3) players has been improved and various contents have been able to be produced or stored using the portable content management devices. Thus, devices that can carry contents have been diversified. With the use of such devices in a home network environment, a method enabling a user to quickly and easily select a device that can play content is required.

When playing content contained in a portable content management device using a player device on a home network constructed with middleware such as Universal Plug and Play (UPnP), a test play is repeated to identify a desired player device among a plurality of content player devices providing the same play function, as shown in FIG. 1.

In other words, even when a user can clearly select a desired player device, a list of player devices that can play a particular content is generated through a discovery process and a description process and the desired player device is selected from the list by a user to use the desired player device connected to a network.

FIG. 1 illustrates a procedure for playing content in a conventional UPnP environment, and more particularly, a procedure in which a portable content management device 10 discovers a content player device 30 desired by a user from among first through third content player devices 20, 30, and 40 existing in a network.

In operation S1, the portable content management device 10 performs a discovery process with the first through third content player devices 20, 30, and 40. In operation S2, the portable content management device 10 requests description needed to control the first through third content player devices 20, 30, and 40 from the first through third content player devices 20, 30, and 40 discovered through the discovery process. In operation S3, the portable content management device 10 receives the description from the first through third content player devices 20, 30, and 40.

In operation S4, the portable content management device 10 generates a list of the first through third content player devices 20, 30, and 40 using the description.

In operations S5, S6, and S7, the portable content management device 10 repeats a test play to find a content player device that can play content selected by a user. In other words, the user may have a difficulty in identifying a desired content player device among the first through third content player devices 20, 30, and 40 provided on the list. Therefore, to identify the desired content player device, the user performs the test play with respect to each of the three content player devices 20, 30, and 40.

Through the test play, the user can identify the desired content player device 30. Thereafter, in operation S8, a control command to play the content is transmitted to the desired content player device 30.

As described above, to play content using a particular content player device among a plurality of content player devices connected to a conventional UPnP network, a user must attempt a test repeatedly with respect to the content player devices.

In addition, to play the content using a content player device that is not connected to the UPnP network, a discovery process and a description process between a portable content management device and player devices are needed to control the content player device according to a UPnP standard.

SUMMARY OF THE INVENTION

The present invention provides a method and system for easily playing content stored in a portable content management device using a content player device designated by a user among a plurality of content player devices performing the same function in a Universal Plug and Play (UPnP) network.

The present invention also provides a method and system for quickly playing content without an unnecessary setup process between a portable content management device and a content player device when the content stored in the portable content management device is played using the content player device that is not connected to a UPnP network.

According to an aspect of the present invention, there is provided a method of identifying a device on a UPnP network, the method including respectively receiving descriptions from a plurality of content player devices, displaying a device list of the plurality of content player devices based on the received descriptions, receiving selection of an item on the device list from a user, sending a device notification request message to a content player device corresponding to the selected item, and executing device notification using the content player device receiving the device notification request message.

According to another aspect of the present invention, there is provided a method of identifying a device on a Universal Plug and Play (UPnP) network, the method including receiving descriptions from a plurality of content player devices, respectively, displaying a device list of the plurality of content player devices through a portable content management device based on the received descriptions, receiving a device notification request message send command from a user through one content player device among the plurality of content player devices, sending a device notification request message from the one content player device to the portable content management device according to the device notification request message send command, and marking an item corresponding to the one content player device that has sent the device notification request message on the device list based on the device notification request message.

According to still another aspect of the present invention, there is provided a Universal Plug and Play (UPnP) system comprising a plurality of content player devices and a portable content management device, wherein the portable content management device receives descriptions from the plurality of content player devices, respectively, displays a device list of the plurality of content player devices based on the received descriptions, receives selection of an item on the device list from a user, and sends a device notification request message to a content player device corresponding to the selected item, and the content player device corresponding to the selected item executes device notification according to the device notification request message.

According to a further aspect of the present invention, there is provided a Universal Plug and Play (UPnP) system comprising a plurality of content player devices and a portable content management device, wherein a content player device selected by a user from among the plurality of content player devices receives a device notification request message send command from the user and sends a device notification request message to the portable content management device, and the portable content management device respectively receives descriptions from the plurality of content player devices, displays a device list of the plurality of content player devices based on the received descriptions, and marks an item corresponding to the content player device that has sent the device notification request message on the device list based on the device notification request message.

According to yet another aspect of the present invention, there is provided a Universal Plug and Play (UPnP) system for playing content using a particular content player device, the UPnP system including a portable content management device sending a device association request message to a content player device through a short-distance wireless communication interface, receiving a device association response message from the content player device through the short-distance wireless communication interface, and sending a content play command generated using a description contained in the device association response message to the content player device through a UPnP network, and a content player device sending the device association response message to the portable content management device in response to the device association request message received from the portable content management device and playing content stored in the portable content management device according to the content play command.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
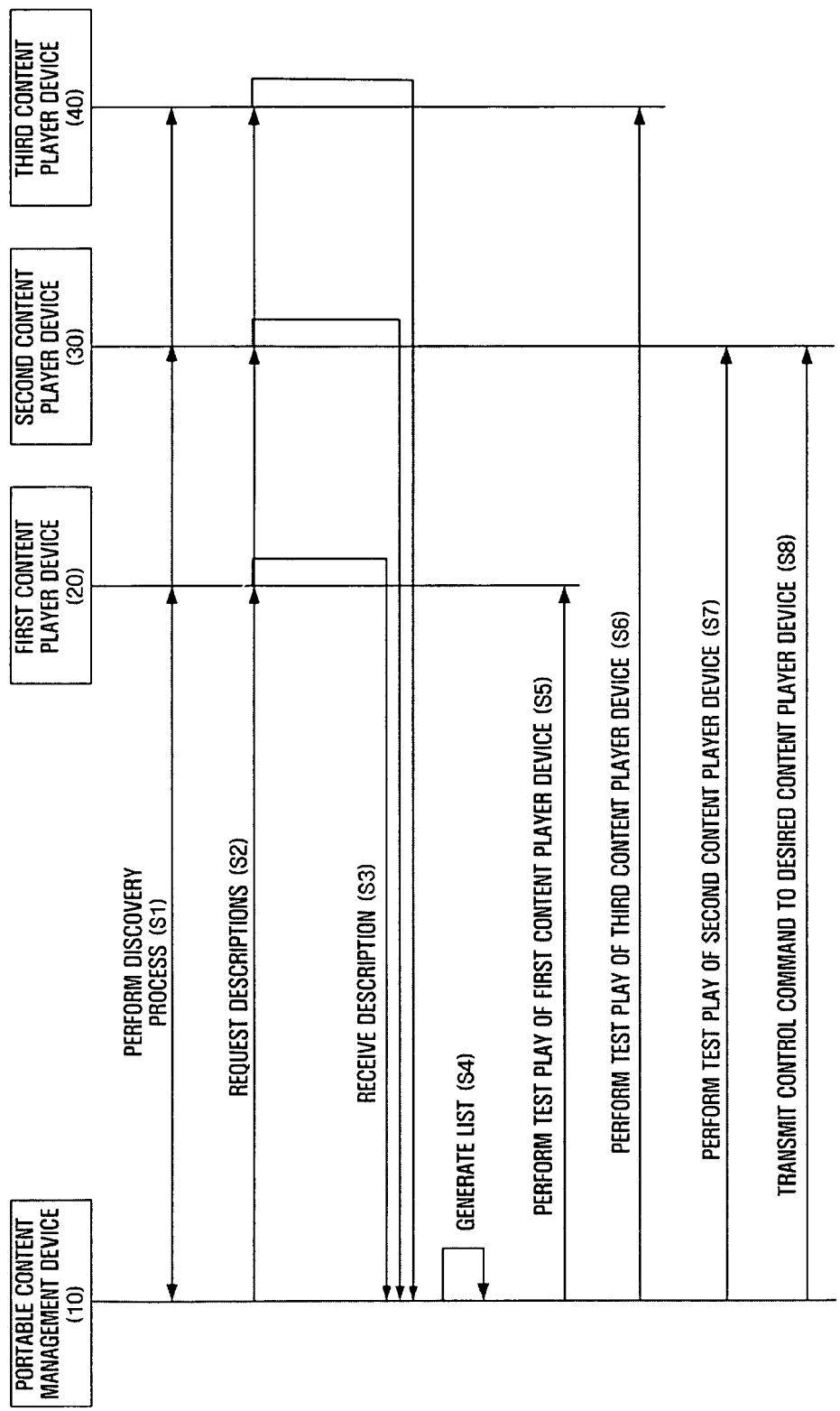
FIG. 1 illustrates a procedure for playing content in a conventional Universal Plug and Play (UPnP) environment.

The present invention will now be described more fully with reference to the accompanying drawings, in which exemplary embodiments of the invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention relates to technology of playing content stored in a portable content management device, such as a portable phone, a personal digital assistant (PDA), or a wireless notebook computer, which generates and stores content (e.g., a multimedia content such as a video, audio, or an image) or downloads and stores content online, using a content player device (e.g., a video player device such as a plasma display panel (PDP), a television (TV), or a personal computer (PC) monitor or an audio player device such as an audio/video (AV) receiver or a TV) on a Universal Plug and Play (UPnP) network.

Figure 2:
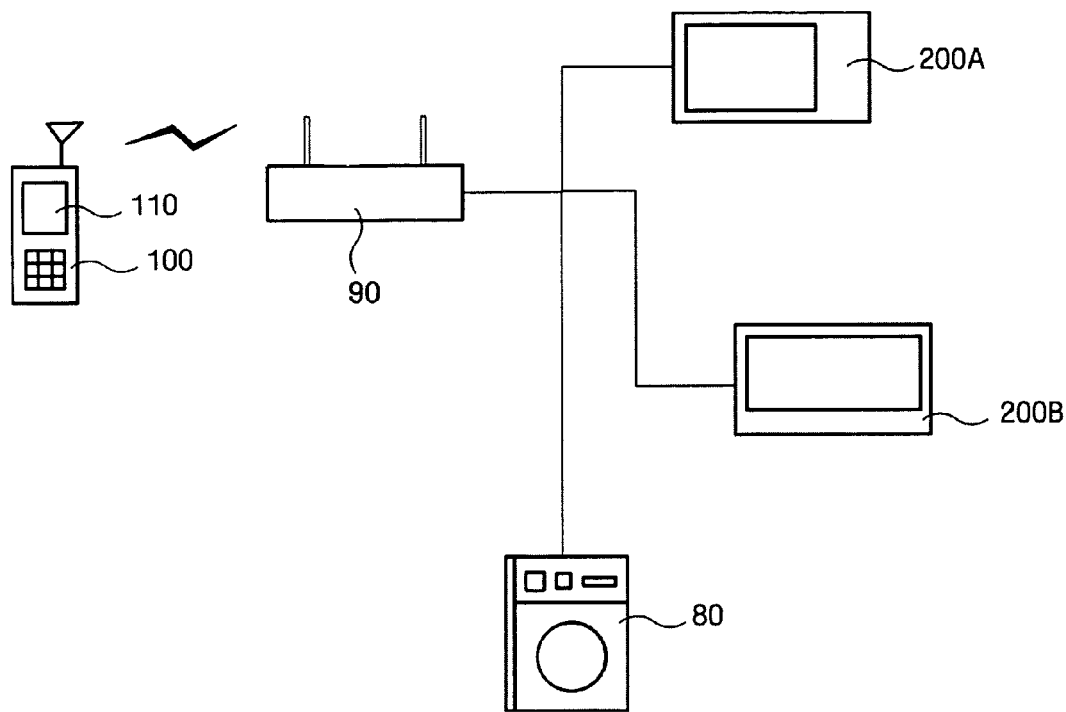
FIG. 2 is a schematic diagram of a system according to the present invention.

FIG. 2 is a schematic diagram of a system according to the present invention. A portable content management device 100 can communicate with an access point 90 via a wireless connection. The access point 90, content player devices 200A and 200B, and another UPnP device 80 are connected via a wired network. Accordingly, the portable content management device 100 and the content player devices 200A and 200B are connected via the same UPnP network. This connection is just an example, and the entire UPnP network may be implemented as a wireless connection or a part of the UPnP network may be implemented as a wireless connection and the other part may be implemented as a wired connection. However, it is preferable that the portable content management device 100 is implemented as a wireless connection taking account of the characteristic of portability.

The portable content management device 100 operates as a control point and the content player devices 200A and 200B operate as controlled devices. The portable content management device 100 can be connected to the UPnP network via a wireless connection and is portable. The portable content management device 100 has a storage space for storing contents. The storage space may be implemented as a memory card so that the storage space is removable and an additional storage space can be secured. In addition, the portable content management device 100 includes a display 110 such as a liquid crystal display to provide a user interface (UI).

The content player devices 200A and 200B receive content from the portable content management device 100 and play the content. The content player devices 200A and 200B may play content after downloading it from the portable content management device 100 or play the content in real time by receiving it in a stream format. The stream format allowing a real-time play may be a Motion Picture Experts Group (MPEG)-2 transport stream (TS) format or a format in which a usual content file is streamed according to a Real-time Transport Protocol (RTP).

The present invention provides three methods of playing content: a method by which a content player device directly performs notification according to a first embodiment; a method by which a content player device provides notification via a portable content management device according to a second embodiment; and a method by which a particular content player device provides information regarding itself in response to a request of a portable content management device through an association process and the portable content management device controls the particular content player device based on the information, according to a third embodiment.

Hereinafter, UPnP technology used in the present invention will be described briefly and then the embodiments of the present invention will be described in detail.

<UPnP Technology>

UPnP technology enables intelligent appliances connected to a network to communicate with each other without a complicated setup procedure and enables an intelligent appliance to discover a service provided by another intelligent appliance. When the UPnP technology is used, devices that have been connected to a network automatically discover a new device that is newly connected to the network by a user and provide a control means so that labor needed for installation or setup is reduced.

The UPnP technology is built upon existing protocols such as an Internet Protocol (IP), a Transmission Control Protocol (TCP), a User Datagram Protocol (UDP), a HyperText Transfer Protocol (HTTP), and an eXtensible Markup Language (XML). The UPnP technology is based on wired or wireless protocols. Data exchanged between devices is expressed in XML and communication is performed using the HTTP. IP networking is used since it facilitates extension to other physical media, enables interoperation between vendors, and promotes positive synergy between Internet and Intranet in the home and office environments. In addition, via bridging, UPnP accommodates media running non-IP protocols.

Figure 3:
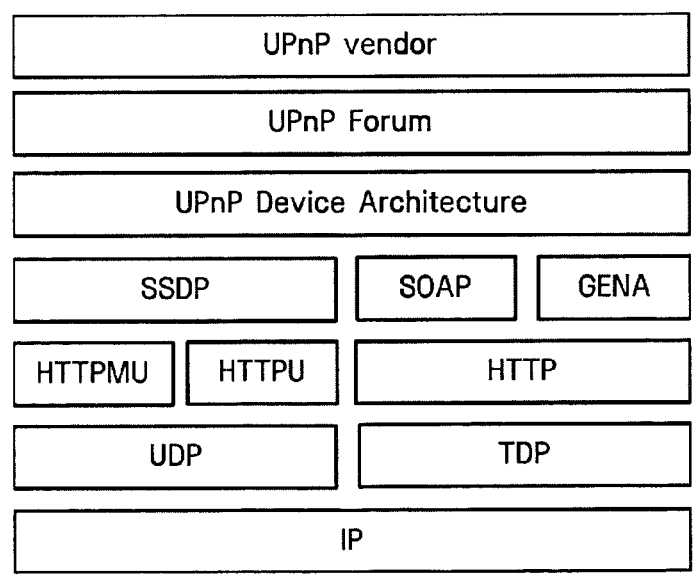
FIG. 3 illustrates the structure of a UPnP protocol.

FIG. 3 illustrates the structure of a UPnP protocol. A UPnP device architecture defines a protocol for communication between a control point and controlled devices. For discovery, description, control, eventing, and presentation, the UPnP device architecture uses a protocol stack shown in FIG. 3.

A highest layer referred to as a "UPnP vendor" contains UPnP vendor-specific information of each device. A layer referred to as a "UPnP Forum" contains information defined by the UPnP Forum. Below a layer referred to as a "UPnP device architecture", protocols such as a Simple Service Discovery Protocol (SSDP), a General Event Notification Architecture (GENA), and a Simple Object Access Protocol (SOAP) specialized for UPnP are present.

The SSDP is used to discover a service on a network. The GENA is used to notify the change of a state of a device to other devices. The SOAP is used by a device to send a control command to another device. Messages formatted using these protocols are delivered via the HTTP, either a multicast or unicast variety running over the UDP, or the standard HTTP running over the TCP. Ultimately, all messages above are delivered over the IP.

Data exchanged between devices in the UPnP is expressed in XML and the devices communicate with each other using the HTTP. The communication between devices using the UPnP is implemented by five steps: discovery, description, control, eventing, and presentation.

During discovery, a control point (i.e., a client wanting to use a service of a UPnP device) searches for services of devices and the devices advertise their services to the control point. The UPnP uses the SSDP including the HTTP running over a multicast UDP for the search and the HTTP running over a unicast UDP for the response. In the SSDP, a search message is used by a client to find a device the location of which is not identified on the network and is designed in terms of multicast only for efficiency.

After a control point has discovered a device having an interesting service, a description process is performed. During the description process, the control point requests and receives the device's description via the HTTP over the TCP. The description process is performed through a standard HTTP GET command. The UPnP description for a device is expressed in XML and includes vendor-specific, manufacturer information like the model name and number, serial number, manufacturer name, uniform resource locators (URLs) to vendor-specific web sites, etc. The description also includes a list of any embedded devices or services, as well as URLs for control, eventing, and presentation. For each service, the description includes a list of the commands or actions and a list of parameters for each command. In addition, the description for a service also includes a list of variables; these variables model the state of the service at run time.

After receiving the device's description, the control point can send a command to the device's service in a control process. The control point sends an appropriate control message to a control URL for the service. The control message is expressed in XML using the SOAP. Like function calls, in response to the control message, the service changes any command-specific values. The command comes into effect when the variables that describe the run-time state of the service change.

Thereafter, eventing and presentation may be further provided, but detailed descriptions thereof will be omitted since they are not essential to embodiments of the present invention. The eventing uses the GENA and the presentation uses a normal HTTP based on the TCP.

First Embodiment

Figure 4:
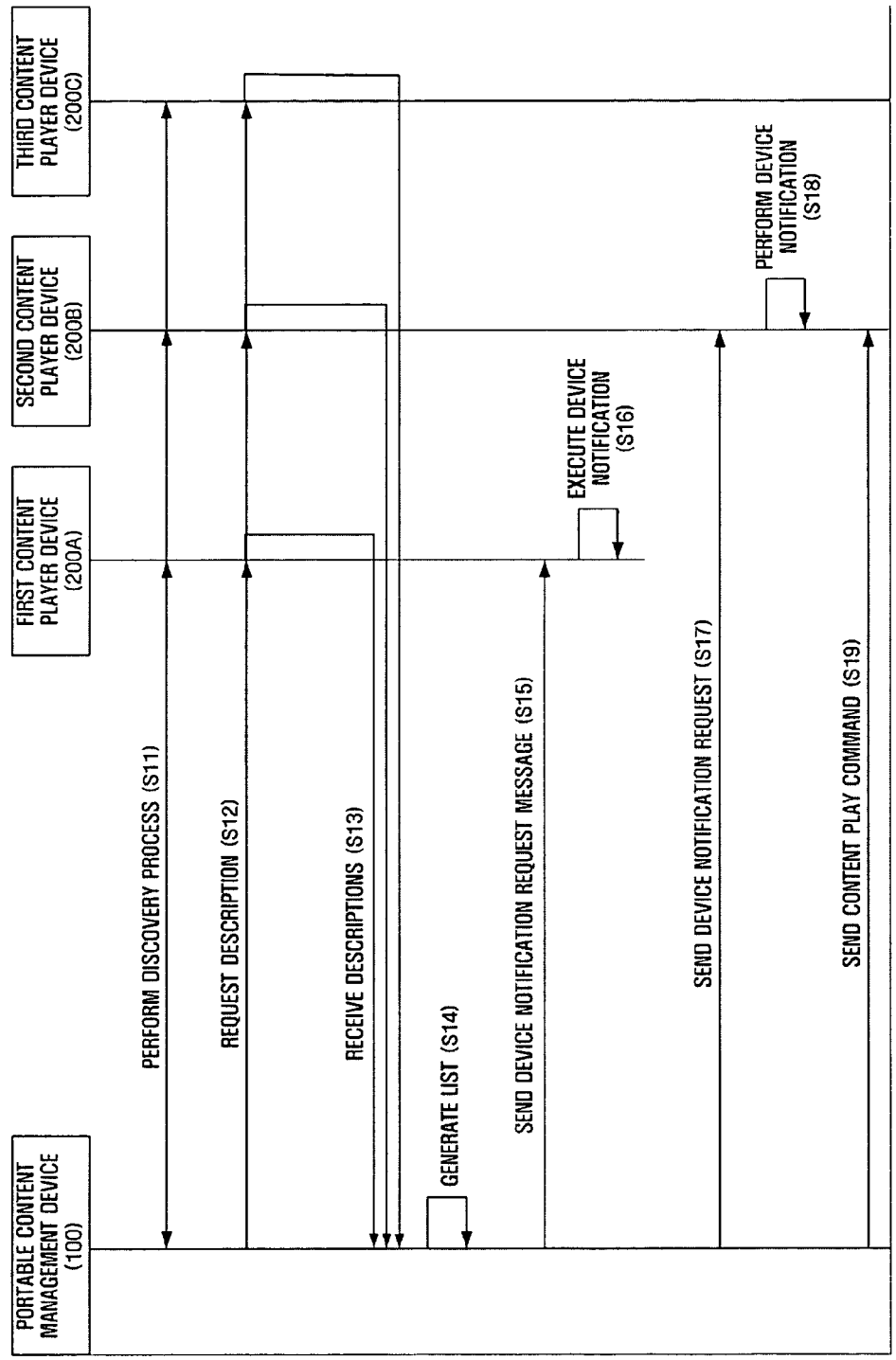
FIG. 4 is a flowchart of a method according to a first embodiment of the present invention.

A first embodiment of the present invention is characterized by that a content player device selected by a user executes device notification to let the user know that the content player device has been selected. FIG. 4 is a flowchart of a method according to the first embodiment of the present invention.

In operation S11, a discovery process is performed between a portable content management device 100 and first through third content player devices 200A, 200B, and 200C. The portable content management device 100 requests a description from each of the first through third content player devices 200A, 200B, and 200C in operation S12 and receives descriptions therefrom in operation S13. The descriptions are expressed in XML and may include a model name, a model number, a serial number, a manufacturer number, a manufacturer's URL, a product URL, etc. Accordingly, the portable content management device 100 can identify a content player device that can play content (e.g., video, audio, or images) desired by a user by analyzing the description. In the first embodiment of the present invention, it is assumed that all of the first through third content player devices 200A, 200B, and 200C can play the content.

In operation S14, the portable content management device 100 generates a list of devices that can play the desired content based on received descriptions and displays the device list to the user through a UI.

Figure 5:
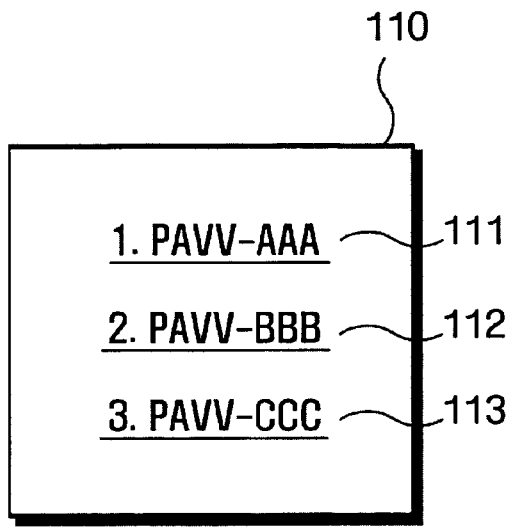
FIG. 5 shows an example of a device list displayed on a display unit included in a portable content management device.

FIG. 5 shows an example of the device list displayed on a display unit 110 included in the portable content management device 100. The first through third content player devices 200A, 200B, and 200C registered in the device list are displayed on the display unit 110. Items 111, 112, and 113 respectively indicating the content player devices 200A, 200B, and 200C may be expressed by a model name, a serial number, a manufacturer name, or a combination thereof. Here, the user can know that one of the items 111, 112, and 113 on the device list corresponds to a content player device that can play the desired content on a UPnP network, but it is difficult for the user to know that each of the items 111, 112, and 113 corresponds to which content player device. In the simple UPnP network shown in the first embodiment, the user may identify each content player device based on identification names such as a product name and a manufacturer name stated in the description. However, it will be difficult in a UPnP network configured in a general ubiquitous environment in which diverse devices are associated or separated.

The user selects one item from the displayed device list. Then, the portable content management device 100 sends a device notification request message to a content player device corresponding to the selected item in operation S15. The selection of the item may be performed using a button (not shown) provided on the portable content management device 100 or a pen input unit (not shown).

In operation S16, the first content player device 200A receiving the device notification request message executes device notification. The device notification is an operation performed by a content player device corresponding to a particular item on the device list to notify itself to the user. The device notification may be executed in different manners according to the specifications of a content player device. When the content player device is an audio player, the device notification may be executed using a particular sound effect. When the content player device is a video player, the device notification may be executed using a visual effect such as a particular message box, image, or flickering that the user can view on a screen. The user can identify a content player device corresponding to the selected item based on the device notification executed by the content player device.

If the identified content player device is not the one that the user wants, the user can select another item from the device list. Then, the portable content management device 100 sends the device notification request message to another content player device corresponding to the selected item in operation S17. The second content player device 200B receiving the device notification request message executes the device notification in operation S18.

With such operations, the user can find an item corresponding to the desired content player device and selects the found item. Then, in operation S19, the portable content management device 100 sends a content play command using the SOAP. Then, the content player device corresponding to the selected item, i.e., the desired content player device plays the content. Playing of the content may be performed after the content is downloaded or may be performed in real time by receiving a real-time stream.

Figure 6:
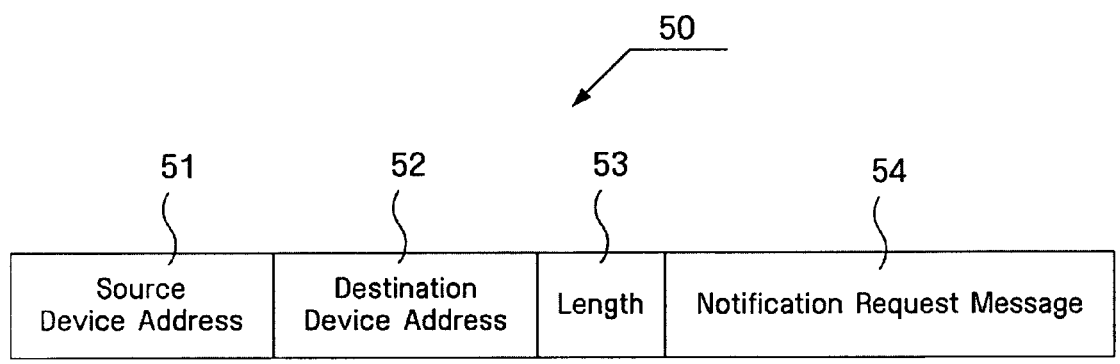
FIG. 6 illustrates the structure of a device notification request message.

FIG. 6 illustrates the structure of a device notification request message 50. The device notification request message 50 includes at least a source device address field 51 containing the address of a device that sends the device notification request message 50, a destination device address field 52 containing the address of a device that receives the device notification request message 50, and a notification request message field 54 containing a command requesting device notification (referred to as a device notification request command) and may further include a length field 53 indicating the size of the notification request message field 54. In the UPnP network, a device's address is an IP address. The device notification request command may be contained in a form of a command code agreed between devices in advance.

Figure 7:
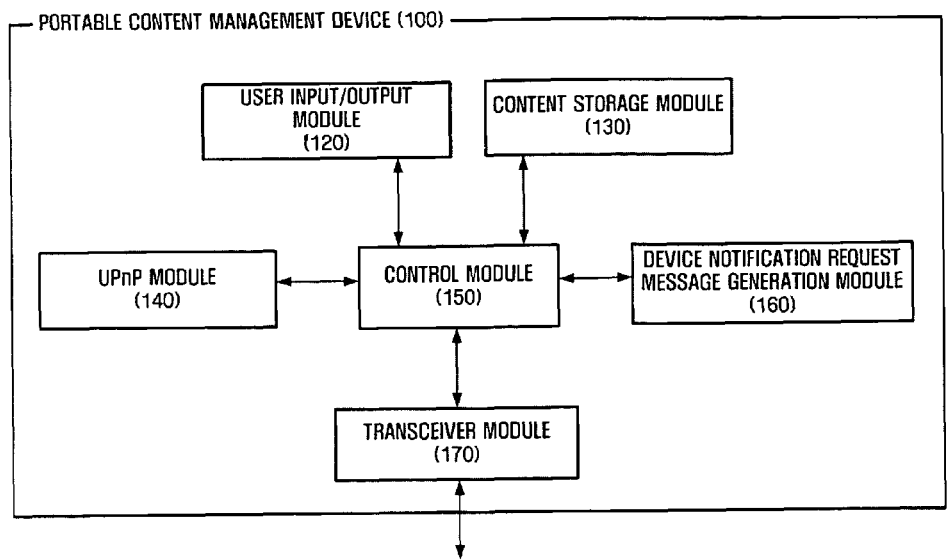
FIG. 7 is a block diagram of a portable content management device according to the first embodiment of the present invention.

FIG. 7 is a block diagram of a portable content management device 100 according to the first embodiment of the present invention. The portable content management device 100 includes a user input/output module 120, a content storage module 130, a UPnP module 140, a control module 150, a device notification request message generation module 160, and a transceiver module 170.

The user input/output module 120 displays a list (i.e., a device list) of content player devices that can play a particular content and receives the selection of an item on the list from the user.

The content storage module 130 stores content and provides the content to a content player device selected by a user.

The UPnP module 140 performs a discovery, description or control process with a content player device according to a UPnP standard.

The control module 150 controls the operations of the other modules included in the portable content management device 100.

The device notification request message generation module 160 generates a device notification request message to be sent to a content player device selected by a user.

The transceiver module 170 transmits and receives data through a wired/wireless network. The transceiver module 170 may be implemented using various data transmission schemes such as Ethernet, wireless local area network (WLAN) standard (Institute of Electrical and Electronics Engineers (IEEE) 802.11 family), Bluetooth, wireless personal area network (WPAN) standard, etc.

Figure 8:
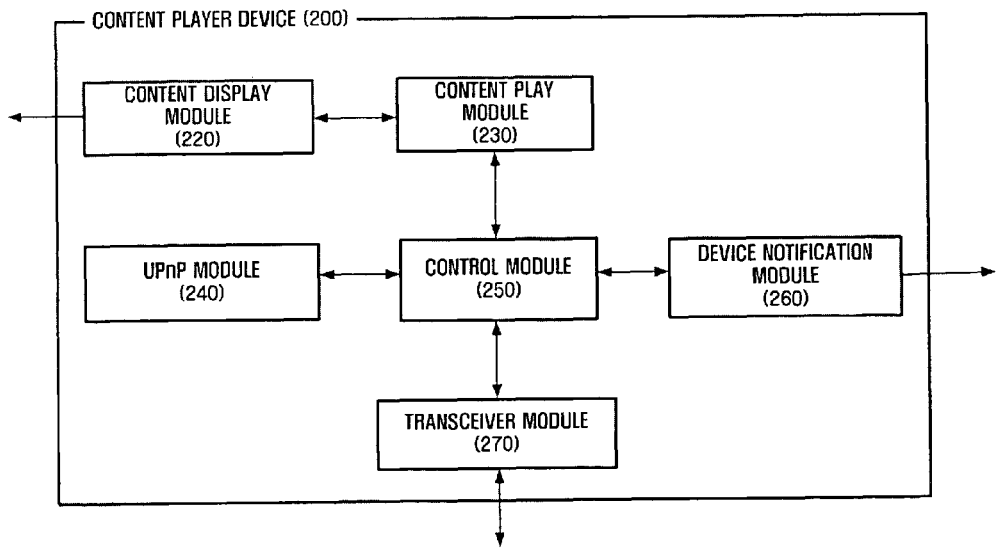
FIG. 8 is a block diagram of a content player device according to the first embodiment of the present invention.

FIG. 8 is a block diagram of a content player device 200 according to the first embodiment of the present invention. The content player device 200 includes a content display module 220, a content play module 230, a UPnP module 240, a control module 250, a device notification module 260, and a transceiver module 270.

The content play module 230 decodes to play content provided from the portable content management device 100. A decoding method is determined according to the format of the content, e.g., an MPEG-2 format, an MP3 format, or a Joint Photographic Experts Group (JPEG) format.

The content display module 220 displays content to a user. When the content is a video or an image, the content display module 220 may be implemented as a display unit such as a liquid crystal display (LCD), a cathode-ray tube (CRT), or a PDP. When the content is an audio, the content display module 220 may be implemented as an audio unit such as an AV receiver.

The UPnP module 240 performs a discovery, description or control process with the portable content management device 100 according to the UPnP standard.

The control module 250 controls the operations of the other modules included in the content player device 200.

The device notification module 260 receives the device notification request message 50 from the portable content management device 100 and executes device notification. The device notification may be executed in different manners according to the specifications of the content player device 200. When the content player device 200 is an audio player, the device notification may be executed using a particular sound effect. When the content player device 200 is a video player, the device notification may be executed using a visual effect such as a particular message box, image, or flickering that the user can view on a screen.

The transceiver module 270 transmits and receives data through a wired/wireless network. The transceiver module 270 is compatible with the transceiver module 170 included in the portable content management device 100.

Second Embodiment

A second embodiment of the present invention is characterized by that a user is allowed to activate a particular function of a content player device and a portable content management device to transmit a device notification request message from the content player device to the portable content management device.

Figure 9:
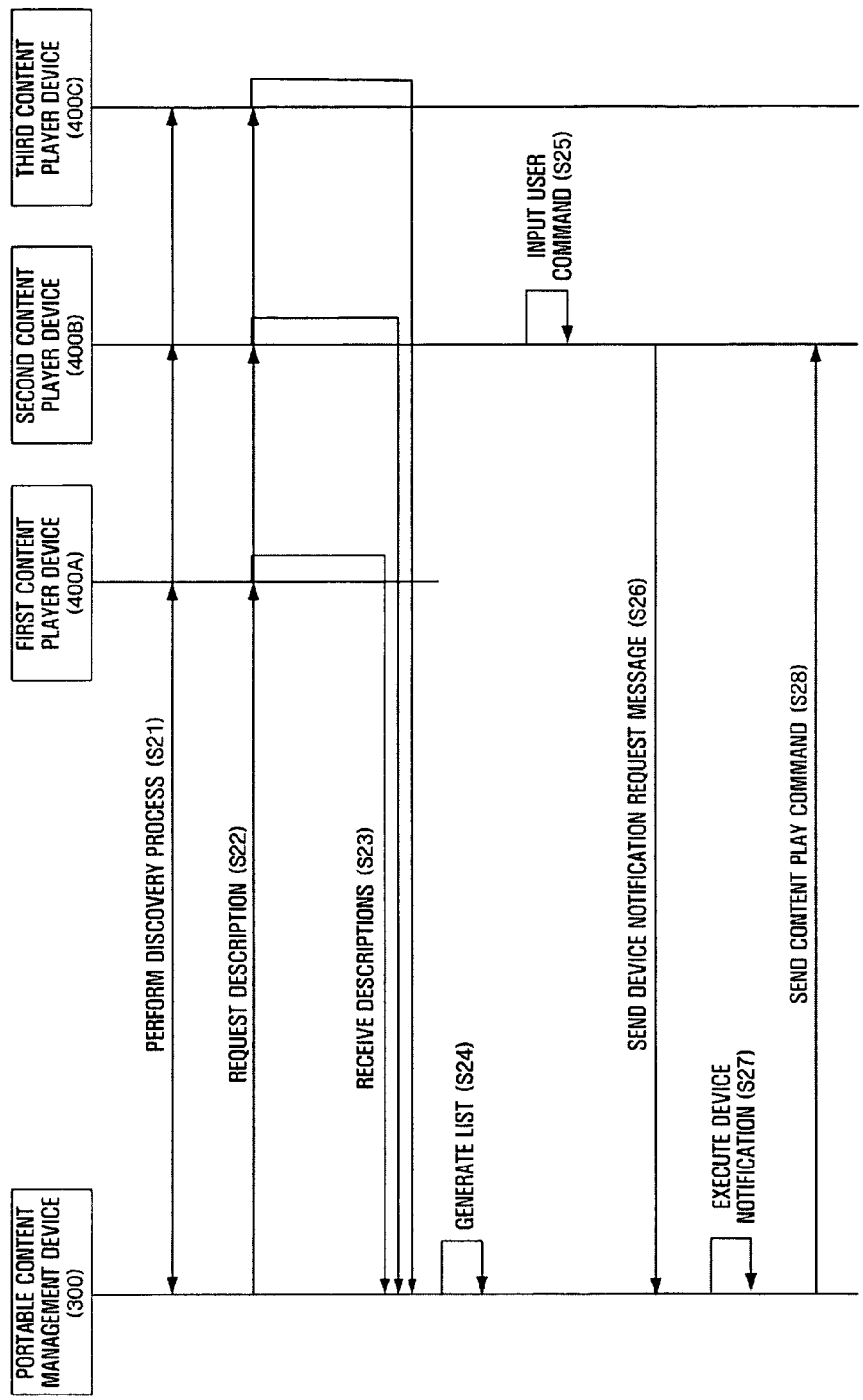
FIG. 9 is a flowchart of a method according to a second embodiment of the present invention.

FIG. 9 is a flowchart of a method according to the second embodiment of the present invention.

In operation S21, a discovery process is performed between a portable content management device 300 and first through third content player devices 400A, 400B, and 400C. The portable content management device 300 requests a description from each of the first through third content player devices 400A, 400B, and 400C in operation S22 and receives descriptions therefrom in operation S23.

Figure 10:
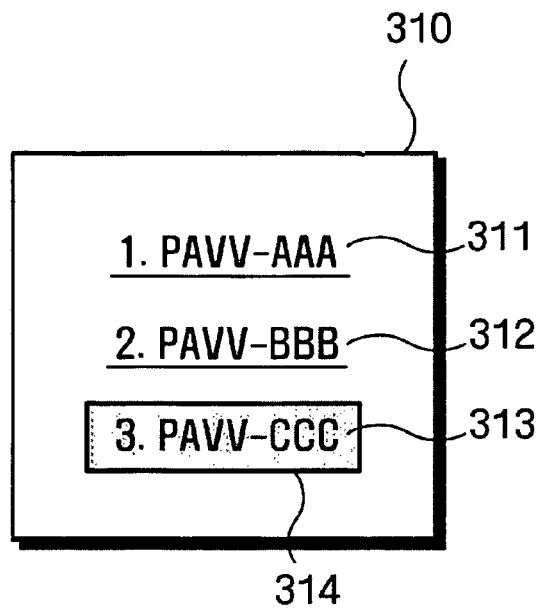
FIG. 10 shows an example in which an item of a device list is visually marked.

In operation S24, the portable content management device 300 generates a list of devices that can play a desired content based on the received descriptions and displays the device list to the user through a UI, as shown in FIG. 10.

To know which one of items on the device list corresponds to a content player device selected by the user, i.e., the second content player device 400B, the user inputs a user command, i.e., a device notification request message send command, instructing the second content player device 400B to send a device notification request message to the portable content management device 300 in operation S25. The second content player device 400B may receive the user command through a particular button provided thereon or by receiving a remote command from the portable content management device 300.

In operation S26, the second content player device 400B generates the device notification request message in response to the user command and sends the device notification request message to the portable content management device 300. The device notification request message may have the same format as the device notification request message sent by the portable content management device 100, as shown in FIG. 6, but it may have a different format.

In operation S27, the portable content management device 300 executes device notification according to the device notification request message. Here, referring to FIG. 10, the device notification is an operation of marking one item, i.e., an item 313 corresponding to the second content player device 400B selected by the user, among items 311, 312, 313 on the device list displayed on a display unit 310 included in the portable content management device 300. For example, a visual expression 314 may be marked on the item 313 as shown in FIG. 10 or a sound expression may be used to indicate the item 313.

With such operations, the user can find an item corresponding to the selected content player device and selects the found item. Then, in operation S28, the portable content management device 300 sends a content play command to the selected content player device. Then, the content player device corresponding to the selected item, i.e., the selected content player device plays the content. Playing of the content may be performed after the content is downloaded or may be performed in real time by receiving a real-time stream.

In the method shown in FIG. 9, generating and displaying the device list to the user (operation S24) may be omitted. Instead, the device list may be displayed when the selected item is marked through the device notification in operation S27.

Figure 11:
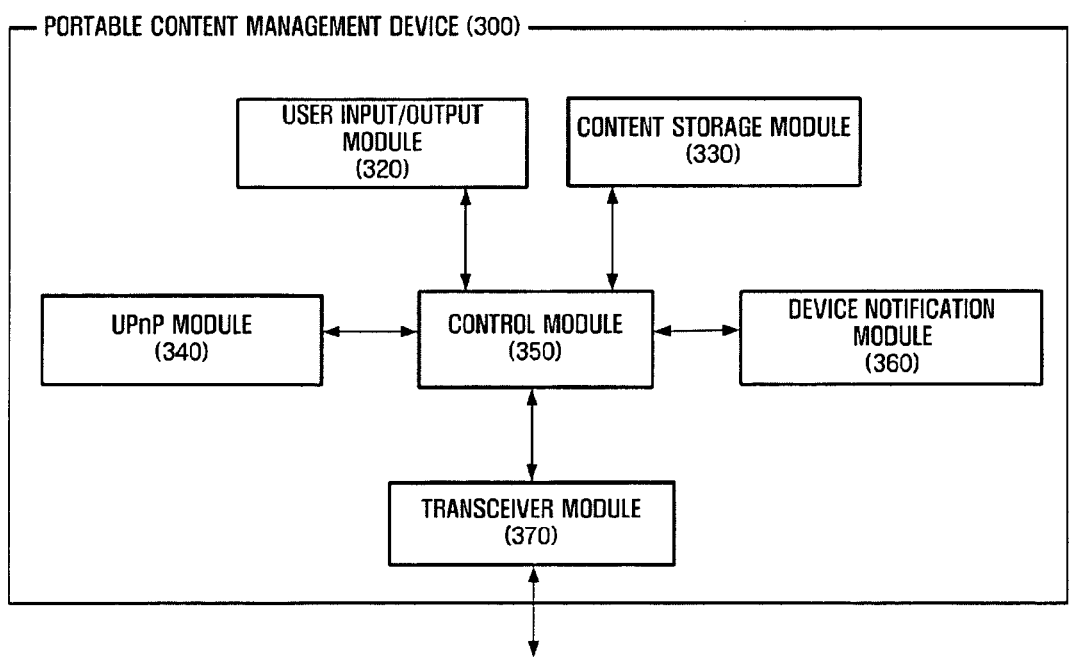
FIG. 11 is a block diagram of a portable content management device according to the second embodiment of the present invention.

FIG. 11 is a block diagram of a portable content management device 300 according to the second embodiment of the present invention. The portable content management device 300 includes a user input/output module 320, a content storage module 330, a UPnP module 340, a control module 350, a device notification module 360, and a transceiver module 370.

The user input/output module 320 displays a list (i.e., a device list) of content player devices that can play a particular content and receives the selection of an item on the list from the user.

The content storage module 330 stores content and provides the content to a content player device selected by a user.

The UPnP module 340 performs a discovery, description or control process with a content player device according to the UPnP standard.

The control module 350 controls the operations of the other modules included in the portable content management device 300.

The device notification module 360 executes device notification according to a device notification request message received from a content player device. Here, the device notification is executed by marking an item (313 in FIG. 10) corresponding to a content player device (400B) selected by a user, among items (311, 312, 313) on the device list displayed on a display unit (310) included in the portable content management device 300.

The transceiver module 370 transmits and receives data through a wired/wireless network. The transceiver module 370 may be implemented using various data transmission schemes such as Ethernet, WLAN standard (IEEE 802.11 family), Bluetooth, WPAN standard, etc.

Figure 12:
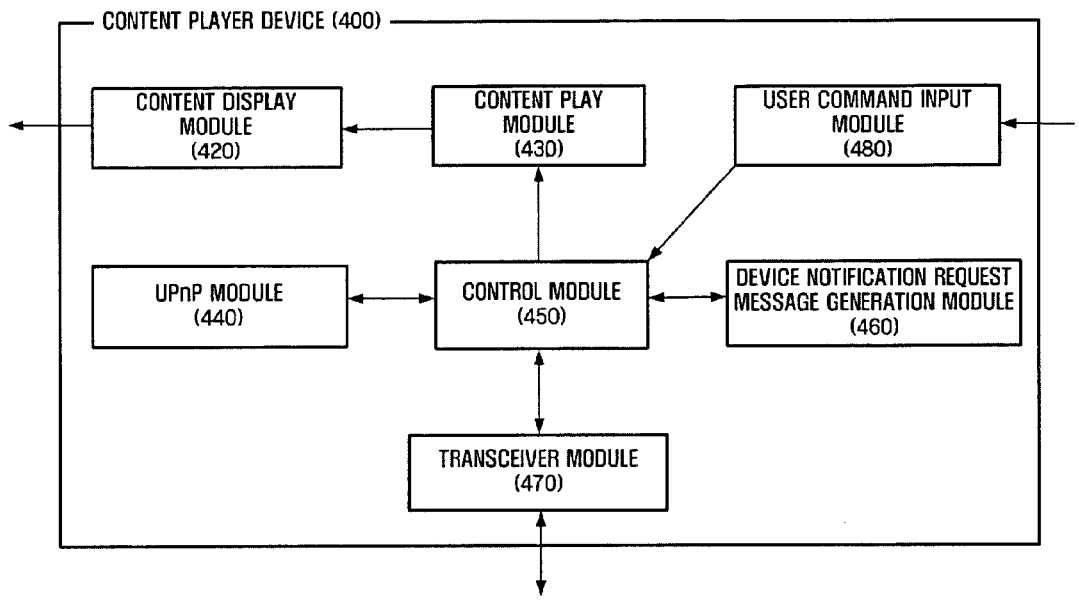
FIG. 12 is a block diagram of a content player device according to the second embodiment of the present invention.

FIG. 12 is a block diagram of a content player device 400 according to the second embodiment of the present invention. The content player device 400 includes a content display module 420, a content play module 430, a UPnP module 440, a control module 450, a device notification request message generation module 460, a transceiver module 470, and a user command input module 480.

The content play module 430 decodes to play content provided from the portable content management device 300. The content display module 420 displays the content to a user.

The UPnP module 440 performs a discovery, description or control process with the portable content management device 300 according to the UPnP standard. The control module 450 controls the operations of the other modules included in the content player device 400.

The user command input module 480 inputs a user command instructing the content player device 400 to send a device notification request message to the portable content management device 300. The user command input module 480 may receive the user command in various ways, for example, through a particular button provided therein and by receiving a remote command from the portable content management device 300.

The device notification request message generation module 460 generates a device notification request message according to the user command and sends it to the portable content management device 100. The device notification request message may have the same format as the device notification request message sent by the portable content management device 100, as shown in FIG. 6, but it may have a different format.

The transceiver module 470 transmits and receives data through a wired/wireless network. The transceiver module 470 is compatible with the transceiver module 370 included in the portable content management device 300.

Third Embodiment

A third embodiment of the present invention is characterized by that a content player device 600 selected by a user sends its device information to a portable content management device 500 through a predetermined communication interface and the portable content management device 500 immediately controls the content player device 600 based on the device information, without a discovery or description process.

Figure 13:
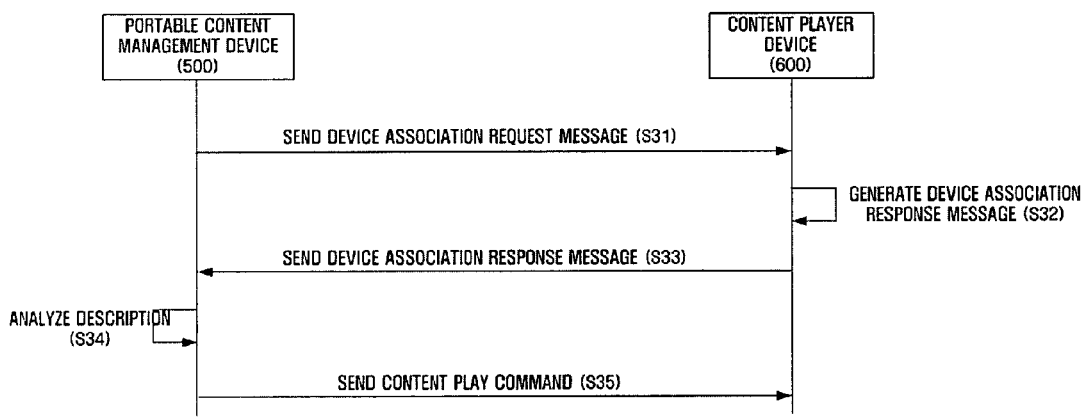
FIG. 13 is a flowchart of a method according to a third embodiment of the present invention.

FIG. 13 is a flowchart of a method according to a third embodiment of the present invention. Unlike the first and second embodiments, the third embodiment does not premise a discovery process and a description process. Accordingly, the portable content management device 500 and the content player device 600 can mutually operate without performing the discovery and description processes therebetween.

In operation S31, the portable content management device 500 sends a device association request message to the content player device 600 through the predetermined communication interface, which may be implemented using diverse short-distance wireless communication technology solutions such as InfraRed Data Association (IRDA) and Radio Frequency IDentification (RFID).

Figure 14:
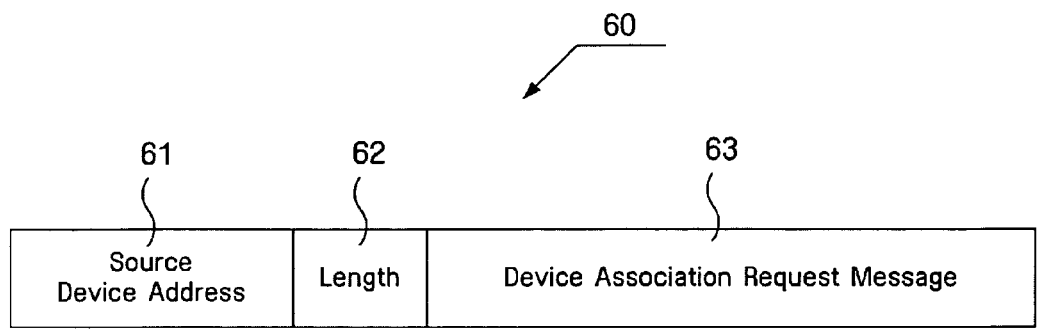
FIG. 14 illustrates the structure of a device association request message.

FIG. 14 illustrates the structure of a device association request message 60. The device association request message 60 includes at least a source device address field 61 containing the address (e.g., the IP address) of a device that sends the device association request message 60, i.e., the portable content management device 500 and a device association request message field 63 containing a command requesting device association (referred to as a device association request command) and may further include a length field indicating the size of the device association request message field 63. The device association request command may be contained in a form of a command code agreed between devices in advance.

In operation S32, the content player device 600 generates a device association response message in response to the device association request message.

Figure 15:
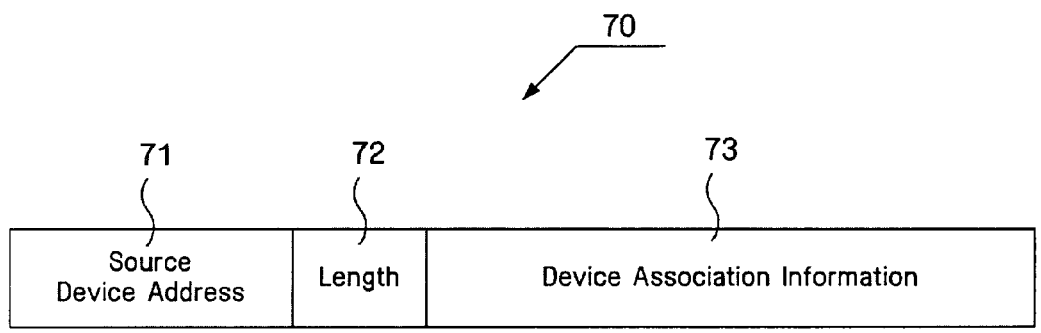
FIG. 15 illustrates the structure of a device association response message.

FIG. 15 illustrates the structure of a device association response message 70. The device association response message 70 includes at least a source device address field 71 containing the address of a device that sends the device association response message 70, i.e., the content player device 600 and a device association information field 73 containing the description of the content player device 600 in response to the device association and may further include a length field 72 indicating the size of the device association information field 73. It is preferable that the description of the content player device 600 is written in a form defined in the UPnP standard since the portable content management device 500 and the content player device 600 comply with the UPnP standard.

In operation 33, the content player device 600 sends the device association response message 70 to the portable content management device 500 using a predetermined communication interface. In operation S34, the portable content management device 500 analyzes the description contained in the device association response message 70. Since the portable content management device 500 serves as a control point, it can perform various UPnP controls on the content player device 600 after receiving the description.

In operation S35, the portable content management device 500 sends a content play command to the content player device 600 using the analyzed description. The content play command may be sent using the SOAP.

Then, the content player device 600 selected by the user can play a particular content. Playing of the content may be performed after the content is downloaded or may be performed in real time by receiving a real-time stream.

Figure 16:
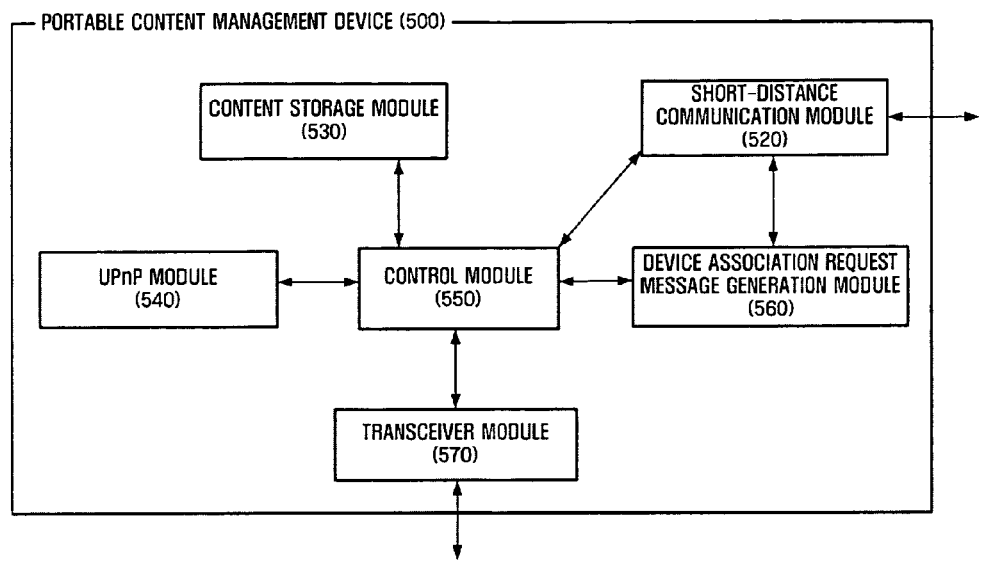
FIG. 16 is a block diagram of a portable content management device according to the third embodiment of the present invention.

FIG. 16 is a block diagram of a portable content management device 500 according to the third embodiment of the present invention. The portable content management device 500 includes a short-distance communication module 520, a content storage module 530, a UPnP module 540, a control module 550, a device association request message generation module 560, and a transceiver module 570.

The content storage module 530 stores content and provides the content to a content player device selected by a user. The UPnP module 540 performs a discovery, description or control process with a content player device according to the UPnP standard. The control module 550 controls the operations of the other modules included in the portable content management device 500.

The device association request message generation module 560 generates a device association request message. The short-distance communication module 520 transmits the device association request message to a content player device selected by a user. The short-distance communication module 520 may be implemented using diverse short-distance wireless communication technology solutions such as IRDA and RFID.

The transceiver module 570 transmits and receives all data, except the device association request message, through a wired/wireless network. The transceiver module 570 may be implemented using various data transmission schemes such as Ethernet, WLAN standard (IEEE 802.11 family), Bluetooth, WPAN standard, etc.

Figure 17:
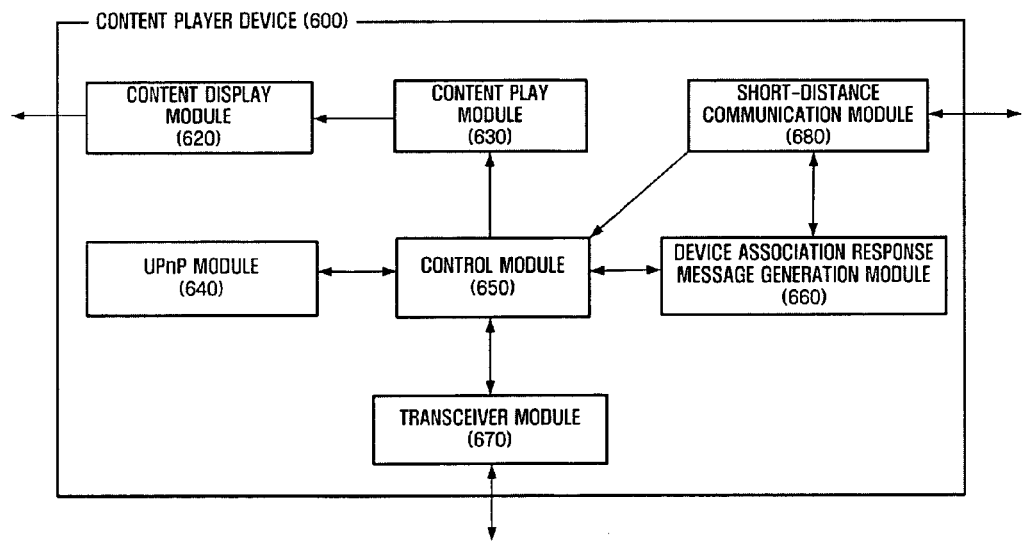
FIG. 17 is a block diagram of a content player device according to the third embodiment of the present invention.

FIG. 17 is a block diagram of a content player device 600 according to the third embodiment of the present invention. The content player device 600 includes a content display module 620, a content play module 630, a UPnP module 640, a control module 650, a device association response message generation module 660, a transceiver module 670, and a short-distance communication module 680.

The content play module 630 decodes to play content provided from the portable content management device 500. The content display module 620 displays the content to a user.

The UPnP module 640 performs a discovery, description or control process with the portable content management device 500 according to the UPnP standard. The control module 650 controls the operations of the other modules included in the content player device 600.

The device association response message generation module 660 generates a device association response message in response to a device association request message received from the portable content management device 500. The device association response message contains the description of the content player device 600. The portable content management device 500 can generate a command instructing the content player device 600 to play content based on the description.

The description may include, for example, vendor-specific, manufacturer information like the model name and number of the content player device 600, serial number, manufacturer name, URLs to vendor-specific web sites, etc. It is preferable that the description of the content player device 600 is written in a form defined in the UPnP standard since the portable content management device 500 and the content player device 600 comply with the UPnP standard.

The short-distance communication module 680 is compatible with the short-distance communication module 520 included in the portable content management device 500. Accordingly, the short-distance communication module 680 may be implemented using diverse short-distance wireless communication technology solutions such as IRDA and RFID.

The transceiver module 670 transmits and receives all data, except the device association response message, through a wired/wireless network. The transceiver module 670 is compatible with the transceiver module 570 included in the portable content management device 500.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

In conventional communication between devices connected to a UPnP network, a discovery process and a description process need to be performed between the devices without a user's intervention. However, it is difficult for the user to identify devices found through these processes. According to the present invention, the user can easily identify the found devices.

In addition, when the user wants to immediately play content using a particular content player device that the user knows, the present invention enables the particular content player device to play the content stored in a portable content management device without performing discovery and description of the particular content player device on a network.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A method of identifying a device on a Universal Plug and Play (UPnP) network, the method comprising:
   receiving, by a content management device, descriptions of a plurality of content player devices connected to the UPnP network;
   displaying a device list which lists the plurality of content player devices based on the received descriptions;
   receiving, from a user, a selection, made on the device list, of a content player device among the plurality of content player devices which is to execute a content stored in the content management device;
   sending, by the content management device, a device notification request message to the selected content player device; and
   executing a device notification in response to the device notification request message, by the selected content player device,
   wherein the device notification physically exhibits on the UPnP network the selected content player device among the plurality of content player devices, and
   wherein the device list does not indicate correspondences between the plurality of content player devices on the device list and the plurality of content player devices on the UPnP network, respectively, so that, when the user selects the selected content player device on the device list to execute a content stored in the content management device at the selected content device, the device list does not indicate which of the plurality of content player devices shown on the UPnP network is to execute the content.

2. The method of claim 1, wherein the device notification is performed using at least one of a sound effect and a visual effect.

3. The method of claim 1, wherein the device notification request message comprises an address of the content management device, an address of the selected content player device, and a device notification request command.

4. The method of claim 1, wherein each of the descriptions include vendor-specific, manufacturer information, a list of any embedded devices or services, and URLs for control, eventing and presentation.

5. The method of claim 1, further comprising receiving a selection of another content player device, made on the device list, among the plurality of content player devices, from the user, if the content player device which executes the device notification is not a content player device among the plurality of content player devices that the user desires for the executing the content.

6. The method of claim 1, further comprising;
   sending the content stored in the content management device to the content player device which executes the device notification if the content player device which executes the device notification is a device which the user desires for the executing the content; and
   playing the content at the content player device which executes the device notification.

7. A method of identifying a device on a Universal Plug and Play (UPnP) network, the method comprising:
   receiving, by a content management device, descriptions of a plurality of content player devices connected to the UPnP network;
   displaying a device list which lists the plurality of content player devices through a content management device based on the received descriptions;
   receiving a command from a user to send a device notification request message, the command being sent to a content player device which is selected by the user on the UPnP network, from among the plurality of content player devices, the selected content device being selected as a device to execute a content stored in the content management device;

sending a device notification request message by the selected content player device to the content management device according to the command; and marking the selected content player device on the device list in response to the device notification request message, wherein the marking physically exhibits on the device list the selected content player device among the plurality of content player devices, and wherein the device list does not indicate correspondences between the plurality of content player devices on the device list and the plurality of content player devices on the UPnP network, respectively, before the marking is performed on the device list, so that when the user selects the content player device on UPnP network to execute a content stored in the content management device, the device list does not indicate which of the plurality of content player devices on the device list is the content player device selected on the UPnP network.

8. The method of claim 7, wherein the device notification request message comprises an address of the selected content player device, an address of the content management device, and a device notification request command.

9. The method of claim 7, wherein the marking is performed using at least one of a visual expression and a sound expression.

10. The method of claim 7, further comprising receiving another command from the user to send the device notification request message, the command being sent to another content player device, which is selected by the user on the UPnP network, from among the plurality of content player devices, if the selected content player device is not a content player device among the plurality of content player devices that the user desires for the executing the content.

11. The method of claim 7, further comprising:

sending the content stored in the content management device to the content player device which executes the device notification if the content player device which executes the device notification is a device which the user desires for the executing the content; and playing the content at the content player device which executes the device notification.

12. A Universal Plug and Play (UPnP) system comprising a plurality of content player devices connected to the UPnP network and a content management device, wherein the content management device receives descriptions of the plurality of content player devices, displays a device list which lists the plurality of content player devices based on the received descriptions, receives, from a user, a selection, made on the device list, of a content player device among the plurality of content player devices which is to execute a content stored in the content management device, and sends a device notification request message to the selected content player device, wherein the selected content player device executes a device notification based on the device notification request message, wherein the device notification physically exhibits on the UPnP network the selected content player device among the plurality of content player devices, and wherein the device list does not indicate correspondences between the plurality of content player devices on the device list and the plurality of content player devices on the UPnP network, respectively, so that, when the user selects the selected content player device on the device list to execute a content stored in the content management device at the selected content device, the device list does not indicate which of the plurality of content player devices shown on the UPnP network is to execute the content.

13. The UPnP system of claim 12, wherein the content management device further receives a selection of another content player device, made on the device list, among the plurality of content player devices, from the user, if the content player device which executes the device notification is not a content player device among the plurality of content player devices that the user desires for the executing the content.

14. The UPnP system of claim 12, wherein the content management device:

sends the content stored in the content management device to the content player device which executes the device notification if the content player device which executes the device notification is a device which the user desires for the executing the content; and controls the content player device which executes the device notification to play the content.

15. A Universal Plug and Play (UPnP) system comprising a plurality of content player devices connected to the UPnP network and a content management device, wherein a content player device, which is selected by a user, from among the plurality of content player devices, on the UPnP network, receives a command from the user to send a device notification request message, and sends the device notification request message to the content management device, the selected content player device being selected as a device to execute a content stored in the content management device, wherein the content management device receives descriptions of the plurality of content player devices, displays a device list which lists the plurality of content player devices based on the received descriptions, and marks the selected content player device on the device list in response to the device notification request message, wherein the marking physically exhibits on the device list the selected content player device among the plurality of content player devices, and wherein the device list does not indicate correspondences between the plurality of content player devices on the device list and the plurality of content player devices on the UPnP network, respectively, before the marking is performed on the device list, so that when the user selects the content player device on UPnP network to execute a content stored in the content management device, the device list does not indicate which of the plurality of content player devices on the device list is the content player device selected on the UPnP network.

16. The UPnP system of claim 15, wherein the content management device receives another command from the user to send the device notification request message, the command being sent to another content player device, which is selected by the user on the UPnP network, from among the plurality of content player devices, if the selected content player device is not a content player device among the plurality of content player devices that the user desires for the executing the content.

17. The UPnP system of claim 15, wherein the content management device:
  sending the content stored in the content management device to the content player device which executes the device notification if the content player device which executes the device notification is a device which theuser desires for the executing the content; and
  controls the content player device which executes the device notification to play the content.

* * * * *